United States Patent
Milan (10) Patent No.: US 12,325,542 B2
(45) Date of Patent: Jun. 10, 2025

(54) UAV WITH PROTECTIVE OUTER CAGE

(71) Applicant: Flyability SA, Lausanne (CH)

(72) Inventor: Guglielmo Milan, Teolo (IT)

(73) Assignee: FLYABILITY SA, Lausanne (CH)

( * ) Notice: Subject to any disclaimer, the term of this patent is extended or adjusted under 35 U.S.C. 154(b) by 1025 days.

(21) Appl. No.: 17/280,165

(22) PCT Filed: Sep. 22, 2019

(86) PCT No.: PCT/EP2019/075439
§ 371 (c)(1),
(2) Date: Mar. 25, 2021

(87) PCT Pub. No.: WO2020/064577
PCT Pub. Date: Apr. 2, 2020

(65) Prior Publication Data
US 2021/0339845 A1 Nov. 4, 2021

(30) Foreign Application Priority Data
Sep. 26, 2018 (EP) ................................... 18197018

(51) Int. Cl.
*B64U 20/30* (2023.01)
*B64U 20/87* (2023.01)
(Continued)

(52) U.S. Cl.
CPC .......... *B64U 30/299* (2023.01); *B64U 20/30* (2023.01); *B64U 20/87* (2023.01); *B64U 2101/30* (2023.01)

(58) Field of Classification Search
CPC .... B64U 20/87; B64U 2101/30; B64D 47/08; F16M 2200/025
See application file for complete search history.

(56) References Cited

U.S. PATENT DOCUMENTS 1,595,194 A * 8/1926 Hotchkin ................ F21V 21/30
362/145
4,593,288 A * 6/1986 Fitzpatrick ............. H01Q 1/428
343/705
(Continued)

FOREIGN PATENT DOCUMENTS

EP 3 239 048 A1 11/2017
WO 2020/064577 A1 4/2020

OTHER PUBLICATIONS

European Patent Office/ISA, International Search Report and Written Opinion for PCT Application No. PCT/EP2019/075439, mail date Oct. 25, 2019.

*Primary Examiner* — Peter M Poon
*Assistant Examiner* — Marisa V Conlon
(74) *Attorney, Agent, or Firm* — SoCal IP Law Group LLP; Angelo Gaz (57) ABSTRACT

An unmanned aerial vehicle comprising an outer protective cage, a propulsion system mounted inside the outer protective cage, a sensor support system fixed on the outer protective cage and a sensor system coupled to the sensor support system. The sensor system is coupled to the sensor support system via a load-limiting coupling mechanism that comprises a spring coupling exerting an elastic bias against the sensor system towards a normal operating position, the sensor system being retractable into the outer protective cage against the elastic bias of the spring coupling upon collision with an external object.

16 Claims, 9 Drawing Sheets

(51) Int. Cl.
  *B64U 30/299*   (2023.01)
  *B64U 10/14*    (2023.01)
  *B64U 101/30*   (2023.01)

(56) References Cited

U.S. PATENT DOCUMENTS

| | | | | |
|---|---|---|---|---|
| 5,311,411 | A * | 5/1994 | Garolfi | B60Q 1/20 |
| | | | | 362/248 |
| 5,418,567 | A * | 5/1995 | Boers | H04N 23/51 |
| | | | | 348/E5.026 |
| 5,768,647 | A * | 6/1998 | Coffin | G03B 17/561 |
| | | | | 396/428 |
| 6,640,740 | B1 | 11/2003 | French | |
| 6,640,780 | B2 | 11/2003 | French | |
| 6,652,164 | B2 * | 11/2003 | Stiepel | F16M 11/2014 |
| | | | | 348/150 |
| 6,918,680 | B2 * | 7/2005 | Seeberger | F21S 8/028 |
| | | | | 362/427 |
| 9,854,905 | B2 * | 1/2018 | Azkue | A47B 46/005 |
| 11,305,875 | B2 * | 4/2022 | Chen | B64C 25/32 |
| 2013/0162479 | A1 | 6/2013 | Kelly | |
| 2013/0193269 | A1 * | 8/2013 | Zwaan | B64D 9/00 |
| | | | | 244/118.1 |
| 2017/0320591 | A1 * | 11/2017 | Tabuteau | H01Q 3/06 |

\* cited by examiner

UAV WITH PROTECTIVE OUTER CAGE

RELATED APPLICATION INFORMATION

This patent claims priority from International PCT Patent Application No. PCT/EP2019/075439, filed Sep. 22, 2019 entitled, "UAV WITH PROTECTIVE OUTER CAGE", which claims priority to European Patent Application No. EP18197018.7, filed Sep. 26, 2018 all of which are incorporated herein by reference in their entirety.

FIELD OF THE INVENTION

This invention relates to an unmanned aerial vehicle (UAV) with a protective outer cage and a sensor system, in particular comprising a camera.

BACKGROUND OF THE INVENTION

Certain UAV's are provided with protective outer cages in the general form of a sphere, made of a geodesic structure, surrounding the flight propulsion system. Many UAV's are provided with cameras, and possibly other sensors, for instance for inspection applications, the camera being provided within the outer protective cage, for instance on the frame supporting the inner propulsion system. The outer protective cage provides excellent protection for the camera and inner propulsion system mounted within the cage against collision with external objects and people. The outer protective cage, however, hinders access to the camera, and, depending on the viewing angle, it interferes with the images captured by the camera. The camera and other sensors could be positioned on the outer protective cage, however they would be exposed to shock and damage during collision with external objects. Certain image capture devices and other sensors are somewhat fragile and do not withstand large or repeated shocks.

SUMMARY OF THE INVENTION

It is an object of the present invention to provide a UAV that is robust and can withstand impacts with external objects without deterioration of the flight propulsion system or cameras mounted thereon.

It is advantageous to provide a UAV that is lightweight and has a high autonomy.

It is advantageous to provide a UAV that is easy to maintain.

It is advantageous to provide a UAV that is reliable, in particular for inspection applications.

Objects of this invention have been achieved by providing the system according to descriptions herein.

Disclosed herein is UAV comprising an outer protective cage, a propulsion system mounted inside the outer protective cage, a sensor support system fixed on the outer protective cage and a sensor system coupled to the sensor support system.

The sensor system is coupled to the sensor support system via a coupling mechanism that comprises a spring coupling exerting an elastic bias against the sensor system towards an operating position, the sensor system being retractable into the outer protective cage against the elastic bias of the spring coupling upon collision with an external object.

The coupling mechanism comprises a load limited releasable rigid coupling providing a stable rigid positioning of the sensor system in said normal operating position, the rigid coupling being releasable upon exercise of a collision force greater than a predetermined threshold.

In an embodiment, the load limited releasable rigid coupling may advantageously comprise a magnetic coupling.

In an embodiment, the sensor system is pivotally mounted to the sensor support system.

In an advantageous embodiment, the sensor support system comprises the cage frame member fixed to the outer protective cage configured to provide an opening allowing the sensor system to project therethrough, the cage frame member comprising a shape configured to replace a frame module shape of the protective outer cage.

In an advantageous embodiment, the cage frame member comprises substantially the shape of a pentagon.

In an advantageous embodiment, the outer protective cage comprises beams connected together to form triangular frame shapes, the triangular frame shapes arranged in frame modules having an outer pentagon shape.

In an advantageous embodiment, the spring coupling comprises a beam plate spring rigidly attached to, or integrally formed with, the cage frame member, the beam plate spring being generally rigid in a direction essentially parallel to a plane of the cage frame member and flexible in an orthogonal direction thereto.

In an advantageous embodiment, the beam plate spring may be formed of a composite material in an essentially planar sheet form, for instance of a carbon fiber, glass fiber or other fiber material embedded in a resin, such as an epoxy resin.

In an embodiment, the spring coupling comprises a traction spring.

In an embodiment, the spring coupling comprises an elastic arm attached at one end to the cage frame member and at the other end to the sensor system, the elastic arm capable of elastically bending and twisting.

In an advantageous embodiment, the elastic arm may be made of an elastomeric material.

In an advantageous embodiment, the sensor system comprises an image capture device for capturing moving or still images.

In an advantageous embodiment, the sensor system and further comprises a lighting system.

In an advantageous embodiment, the sensor system comprises a sensor guard that extends beyond a front face of the sensor system.

Further objects and advantageous aspects of the invention will be apparent from the following detailed description and accompanying figures.

BRIEF DESCRIPTION OF THE DRAWINGS

The invention will now be described with reference to the accompanying drawings, which by way of example illustrate embodiments of the present invention and in which:

FIG. 1d is an exploded view of the UAV of FIG. 1a;

FIG. 2a is a perspective view of a UAV according to a second embodiment of the invention with a propulsion system removed to better illustrate the outer protective cage and sensor system;

FIG. 2b is a perspective view of the sensor system and sensor support system of the embodiment of FIG. 2a;

FIG. 2c is a side view of a portion of the embodiment of FIG. 2a;

FIG. 2d is a side view of the sensor system and sensor support system of the embodiment of FIG. 2a, showing the sensor system in the retracted position;

FIG. 3b is a side view of a portion of the embodiment of FIG. 3a;

FIG. 4a is a side view of the UAV according to a fourth embodiment of the invention, with the propulsion system removed to better illustrate the outer protective cage and sensor system;

FIG. 4b. is an exploded perspective view of the outer protective cage and sensor system of FIG. 4a;

FIG. 4c is a perspective view of the sensor system and sensor support system of the UAV of FIG. 4a;

FIG. 4d is a side cross-sectional view of the components of FIG. 4c;

FIG. 4e is a side view of the components of FIG. 4c showing the sensor system in a retracted position;

FIG. 5b is a side view of the embodiment of FIG. 5a;

FIG. 6a is a perspective view of a sensor system and sensor support system of a UAV according to a sixth embodiment;

FIG. 6b is a side view of the components of FIG. 6a;

FIG. 6c is a side view of the components of FIG. 6a showing the sensor system in a retracted position;

DETAILED DESCRIPTION OF EMBODIMENTS OF THE INVENTION

Referring to the figures, a UAV 1 according to embodiments of the invention comprises an outer protective cage 3, a propulsion system 2 mounted inside the outer protective cage 3, a sensor support system 5 fixed on the outer protective cage 3 and a sensor system 4 coupled to the sensor support system.

The propulsion system 2 may comprise one or more propellers driven by electric motors controlled by a control system and powered by one or more batteries according to various configurations that are per se known in the art. Within the scope of the invention, the propulsion system may however be driven by other types of motors, for instance combustion motors and the energy source provided in the form for instance of liquid fuel. In preferred embodiments, the propulsion system may comprise 3 or 4 propellers, for instance in a rectangular configuration, the propellers being individually controlled, or controlled in pairs, to adjust the roll, yaw, and pitch angles of the UAV for flight and hovering of the UAV.

The outer protective cage may for instance comprise a generally spherical or generally ovoid shape, such that the flight propulsion system 2 is protected from all sides in case of collision with an external object.

Figures 4A, 4B, 4C, 4D, 4E:
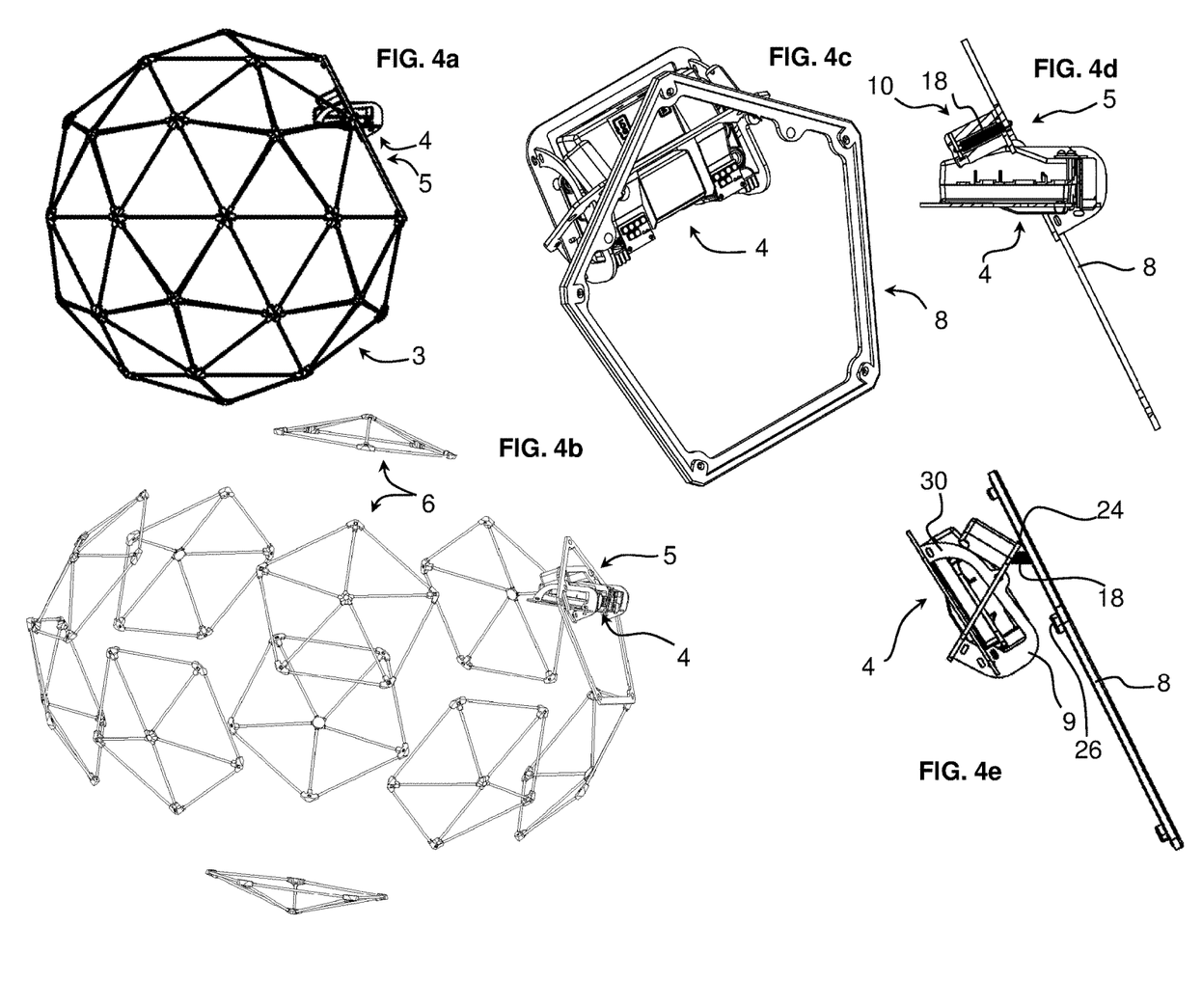

In a preferred embodiment, the outer protective cage comprises beams 11 connected together to form triangular frame shapes. In a preferred embodiment, the triangular frame shapes may be arranged in frame modules 6 and advantageously have an outer pentagon shape, the frame modules 6 being fixed together by connectors 12 as illustrated in FIG. 4b.

The connectors 12 may be permanently attached to the extremities of the beams 11, or in a preferred embodiment, the connectors 12 may be configured to allow removable connection between frame modules 6 such that the outer protective cage can be assembled from modules 6 and disassembled at least partially. The assembly and disassembly of the frame modules 6 may be used to facilitate shipping of the UAV by providing the outer protective cage in parts that may be connected together prior to use, and disconnected in two or more parts for packaging, storage and transport. The disassembly of frame modules 6 may also be used for maintenance, for instance for replacing frame modules with broken beams, or for accessing the flight propulsion system inside the outer protective cage.

The sensor support system 5 comprises a cage frame member 8 that in preferred embodiments comprises an outer profile similar to a cage frame module 6 such that the sensor support system 5 may be fixed to the outer protective cage forming part of the outer protective cage in replacement of one of the cage frame modules 6. In advantageous embodiments, the cage frame member features a pentagon shape.

The sensor system 4 is coupled to the sensor support system 5 via a load-limiting coupling mechanism 10 that comprises a spring coupling 18 that may have various configurations depending on the embodiment. The spring coupling may comprise traction springs, compression springs, torsion springs, constant force springs, rubber joints and elastic bands (e.g. rubber bands). The load-limiting coupling mechanism may advantageously also comprise a load limited releasable rigid coupling 26 based on various coupling mechanisms, including magnetic, electromagnetic, pneumatic, elastic snap-fit, or friction based, to provide a stable normal operating position for the sensor system 4.

The sensor system 4 comprises an image capture device 7, for instance in particular a video camera for capturing moving or still images, and may further comprise a lighting system 14, for instance for projecting infrared or visible light for the image capture device 7.

The sensor system may comprise further sensors such as a sample probe, a gas sensor, a proximity sensor, a magnetic sensor, or a capacitive sensor, depending on the intended applications for the UAV. The sensor system may comprise various shapes and sizes mounted in one or more units as a single or a multi component part supported on a housing or a support frame of the sensor system.

The sensor support system 5 comprises the cage frame member 8 fixed to the outer protective cage 3 configured to provide an opening allowing the sensor system 4 to project therethrough, in particular the lens of the image capture device 7 or front sensing face of other sensors, so that the image capture device has an unhindered view over a wide angle of the environment around the UAV.

The sensor support system further comprises a sensor guard 9 that extends beyond the front face of the sensor system 4. The sensor guard 9 is attached to the support structure or housing 30 of the sensor system 4 to protect the sensor system front face from contact with external objects, whereby if the sensor guard 9 collides against an external object, it displaces the sensor system into a retracted position within the outer protective cage 3 behind the cage frame member 8. The coupling mechanism 10 with the spring coupling 18 allows the sensor system to be elastically pushed into the outer protective cage 3 upon collision or contact with an external object.

As seen in FIG. 1a to 1f, in a first embodiment, the coupling mechanism 10 comprises a hinge 24 pivotally coupling the sensor system support structure 30 to the cage frame member 8. Traction springs 20 of the spring coupling 18 elastically bias the sensor system 4 into the outmost position corresponding to the position where the image capture device 7 has its normal operating position with unhindered view. The hinges may for instance be provided by hinge pins that engage in aligned holes in the cage frame member 8 and support member 16. The hinge 24 may also be formed by an elastic coupling 18 without a pin or rigid rotation axis, for instance as found in the embodiment of FIG. 4c-4e. This advantageously provides some lateral flexibility in the hinge to better support lateral and frontal collision forces.

Figure 1A:
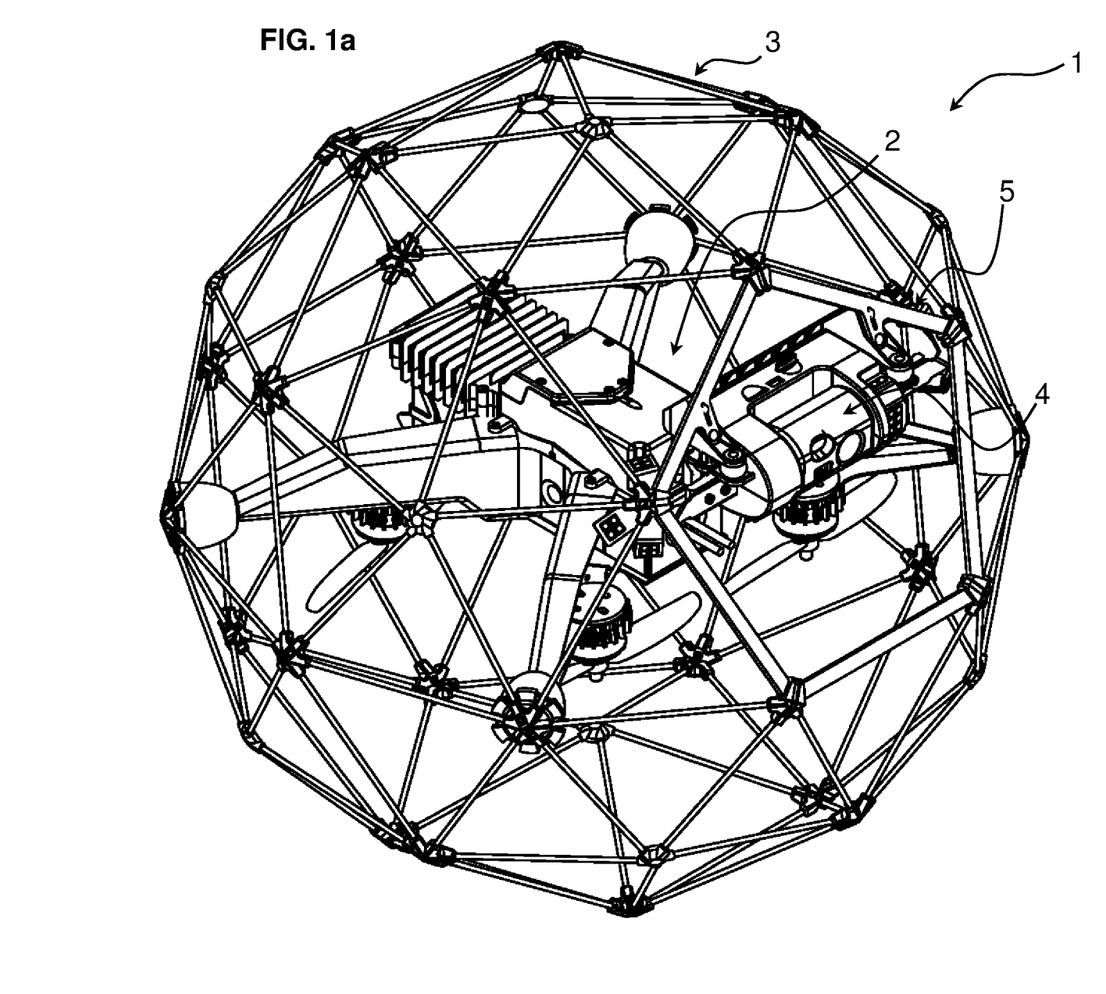
FIG. 1a is a perspective view of a UAV according to a first embodiment of the invention.
Figures 1B, 1C:
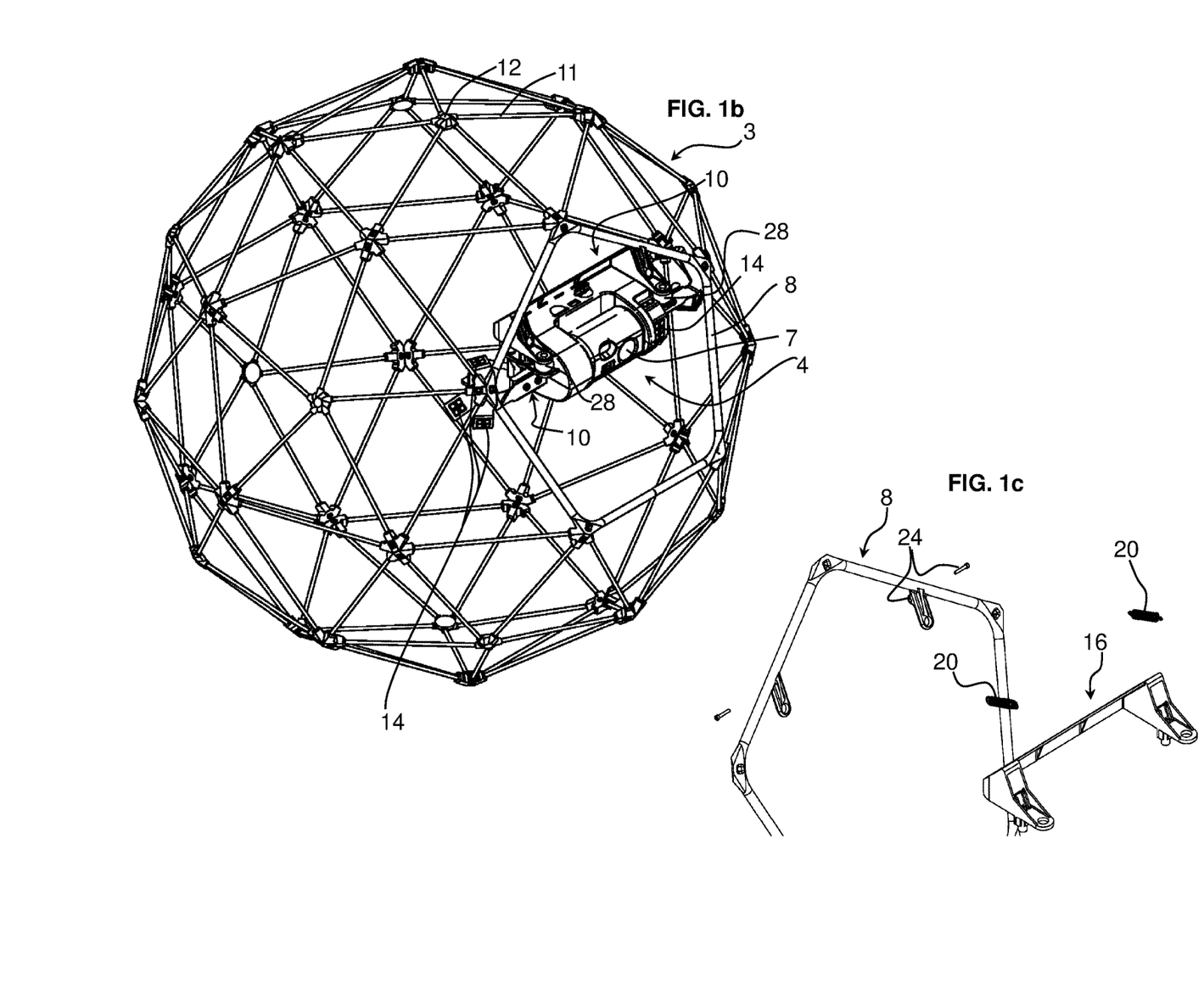
FIG. 1b is a view similar to FIG. 1a with the propulsion system of the UAV removed to better illustrate the outer protective cage and sensor system.
FIG. 1c is a perspective view of part of a support of the sensor system of the embodiment according to FIG. 1b.
Figure 1D:
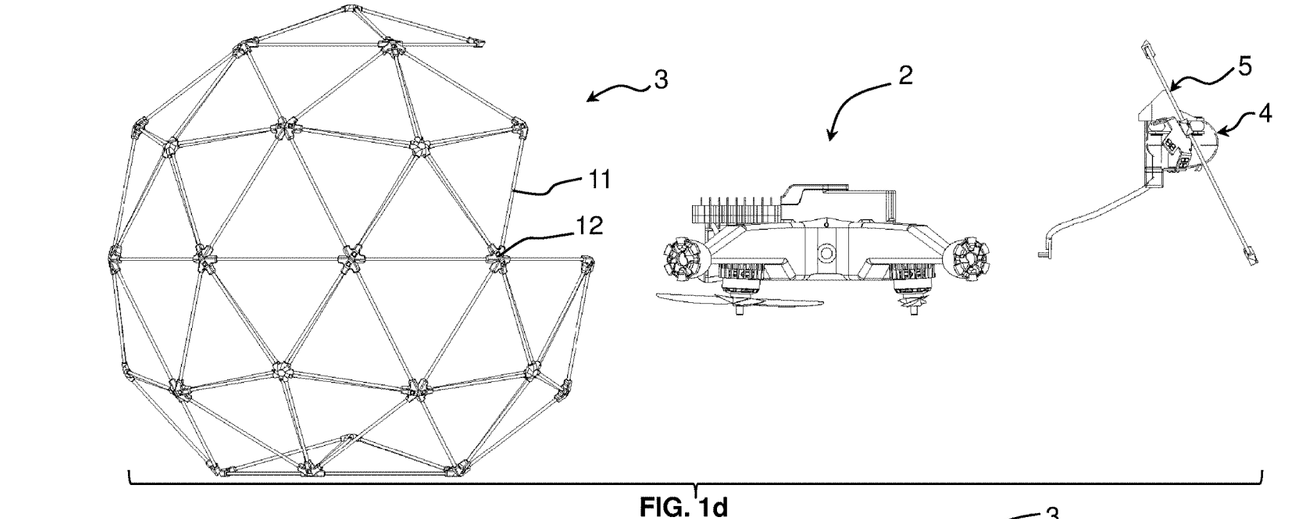
Figure 1E:
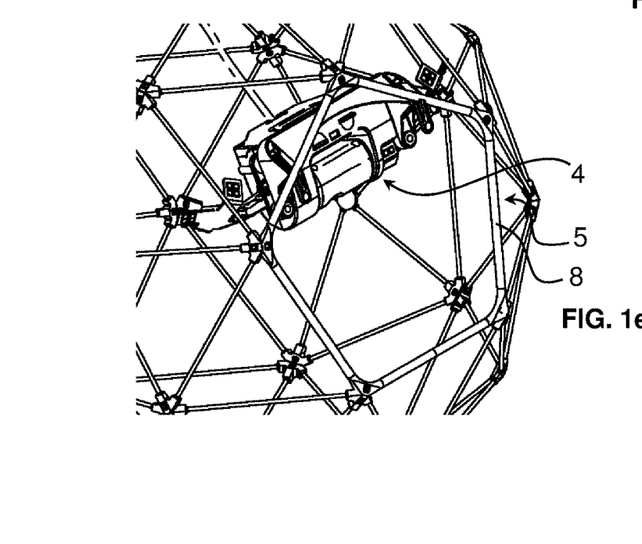
FIG. 1e is a detailed view of FIG. 1b showing the sensor system in a retracted position.
Figure 1F:
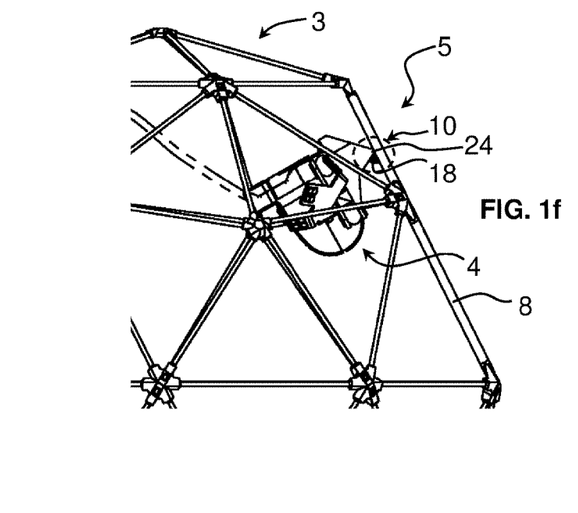
FIG. 1f is a side view of the components of FIG. 1e.
Figures 2A, 2B, 2C, 2D:
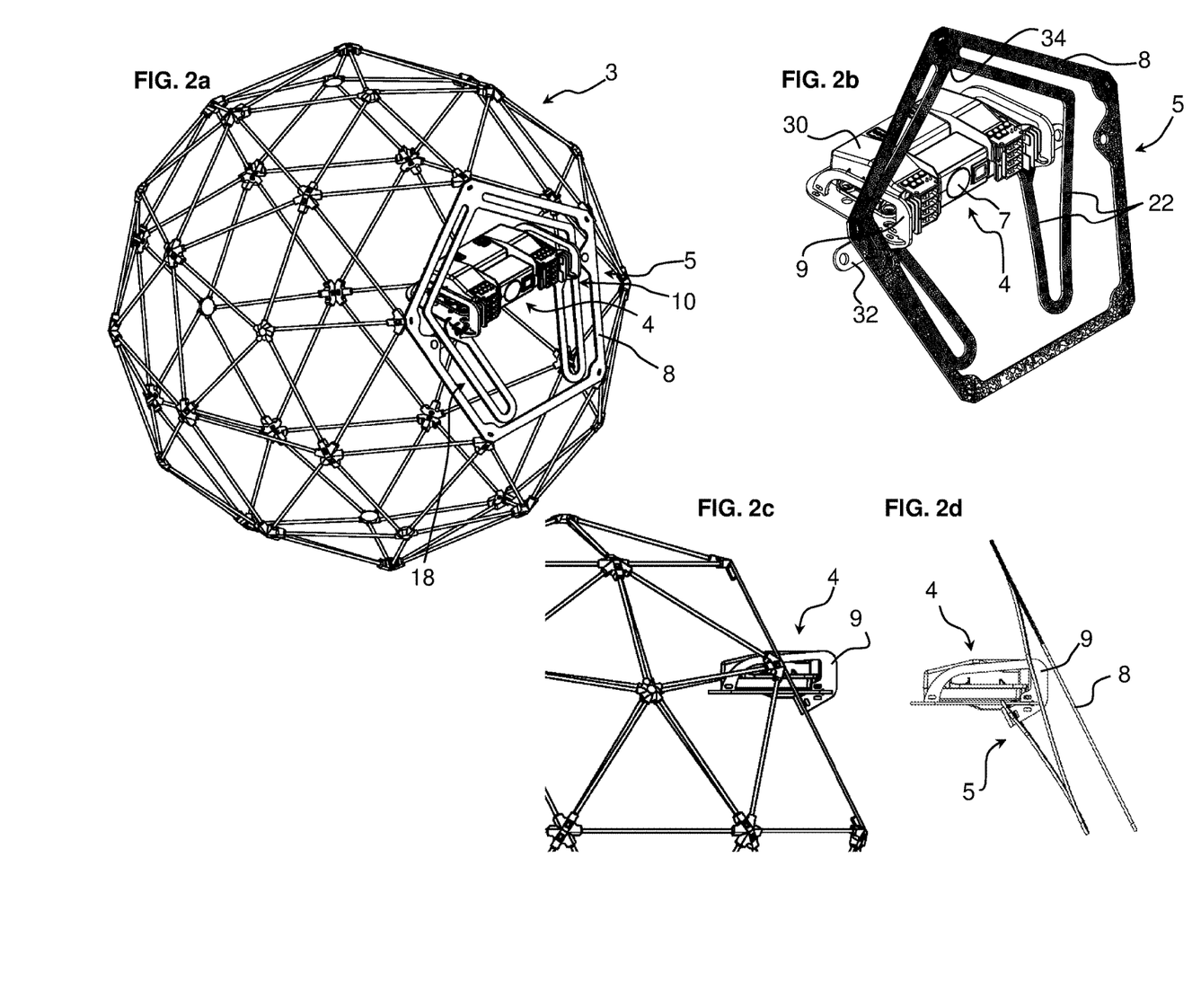

In a second embodiment illustrated in FIGS. 2a to 2d, the spring coupling 18 is provided in form of a beam plate spring 22 that may either be fixed or welded to the cage frame member 8 or integrally formed with the cage frame member 8, for instance in a composite material with a certain elasticity in a direction orthogonal to the major surface of the beam plate spring 22. The cage frame member and beam plate spring may for instance be formed in an essentially planar sheet form, for instance of a carbon fiber, glass fiber or other fiber material embedded in a resin such as an epoxy resin. In an embodiment, the beam plate spring 22 comprises a general V shape formed in a plane of the cage frame member 8. The coupling mechanism 10 may be integrally formed as a single part with the cage frame member 8, or may be bonded, welded, riveted, bolted or attached by various other means thereto. The cage frame member 8 may advantageously be fixed to the outer protective cage 3 in lieu of one of the frame modules 6, and is elastically coupled via the beam plate spring 22 to the support structure or housing 30 of the sensor system 4. The beam plate spring structure is generally rigid in a direction essentially parallel to the plan of the cage frame member 8 and flexible in the orthogonal direction such that collision of the sensor system 4 with an external object pushes the sensor system 4 in a retracted position within the outer protective cage 3 behind the cage frame member 8, for instance as illustrated in FIG. 2d.

A position stop 32, for instance comprising a tab extending from the sensor support system 5, abuts against a rear side (i.e. a side facing an inside of the protective outer cage 3) of the cage frame member 8 such that the sensor support system is held in a stable fixed position relative to the outer protective cage in the normal operating position. In order to ensure a stable position, the beam plate spring may advantageously be in an elastically prestressed condition such that the position stop 32 abuts against the cage frame member 8 with an elastic biasing force.

A damping pad or other damping element (not shown) may further be provided between the position stop and cage frame member to dampen shock and vibration therebetween.

In addition or alternatively, the position stop may comprise a load limiting rigid coupling mechanism such as a magnet or ferromagnetic element on the position stop 32 and a complementary ferromagnetic material or magnet on the cage frame member 8 to provide a stable position in the normal operating position. In variants, other types of load limited releasable mechanisms for stable or rigid coupling of the sensor support system to the outer protective cage may be provided, such as a releasable mechanical clip.

Figure 3A:
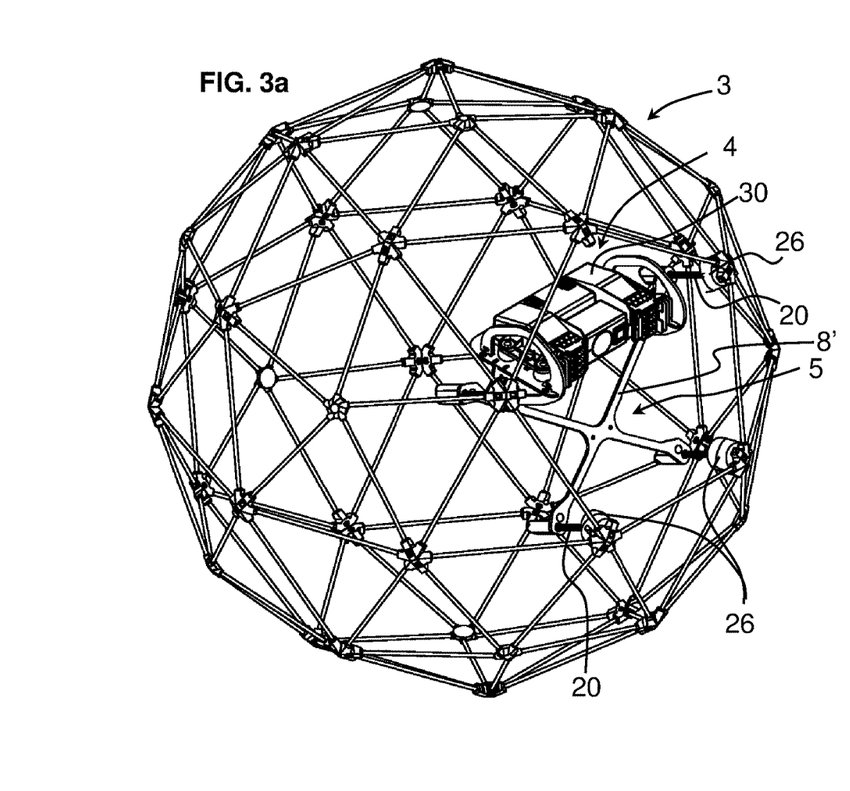
FIG. 3a is a perspective view of a UAV according to a third embodiment of the invention, with the propulsion system removed to better illustrate the outer protective cage and sensor system.
Figure 3B:
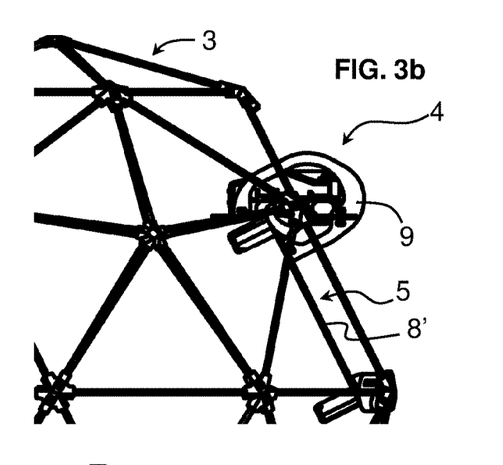
Figure 3C:
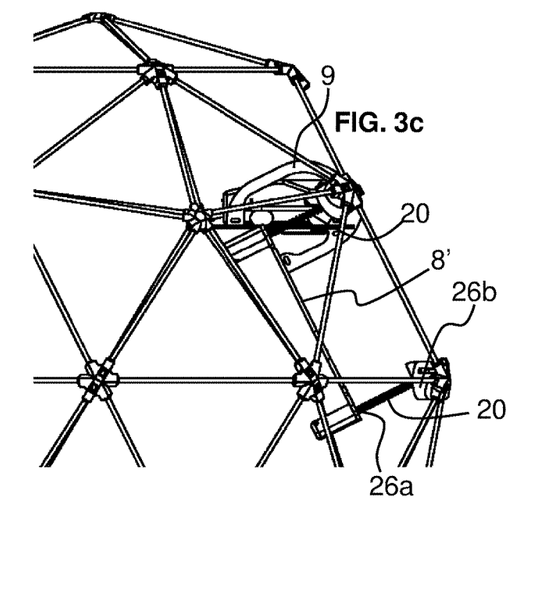
FIG. 3c is a view similar to FIG. 3b, showing the sensor system in a retracted position.

In the embodiment illustrated in FIG. 3c, the sensor support system 5 comprises a frame element 8' that is fixed to the sensor system 4, in particular the support structure or housing 30 of the sensor system, the frame element 8' being coupled to the outer protective cage via traction springs 20. In the illustrated embodiment, the frame element 8' comprises a general X shape but other forms may be provided within the scope of the invention, such as a rectangle, polygon, circle or other shapes. In this embodiment, the whole cage frame element 8' and sensor system 4 can be pushed into a retracted position within the outer protective cage 3 against the elastic force of the traction springs 20 that are interconnected between the nodes of the frame element and the outer protective cage 3.

In order to fix the position of the sensor support system and thereby the sensor system 4 with respect to the outer protective cage 3 in the normal operating position, the cage frame member 8 may advantageously be provided with a magnetic coupling 26. The magnetic coupling may comprise a permanent magnet in two, three or four positions, for instance at the nodes of the frame element 8' or extremities of the frame element 8', a permanent magnet being mounted on the outer protective cage 3 or on the cage frame element 8' or on both, the complementary element having a ferromagnetic material such as an iron alloy.

Thus, when the traction spring elements pull the sensor support system back to its normal position, the magnetic coupling 26 ensures that the cage frame element 8' is positioned in a stable and correctly oriented position with respect to the outer protective cage 3.

Referring to FIGS. 4a to 4e, a fourth embodiment of a UAV according to the invention is illustrated. In this embodiment, the sensor support system 5 is pivotally mounted to the cage frame member 8 which is similar to the cage frame of the first and second embodiments. The cage frame member comprises a substantially pentagonal shape that corresponds to the shape of frame module 6 and replaces a frame module within the outer protective cage 3.

In case of collision with external objects, the sensor system and sensor support system 4, 5 pivot into the protective outer cage behind the plane of the cage frame member 8. A spring coupling 18, for instance in form of a traction spring or a torsion spring or other type of spring, elastically biases against the pivoting inwards displacement such that once the spring coupling has absorbed the rebound kinetic energy of the sensor support system, the latter may pivot back into its operating position as illustrated in FIGS. 4a and 4d, the retracted position being illustrated in FIGS. 4c and 4e. In this embodiment it is also advantageous to provide a load limited rigid coupling mechanism such as magnet coupling as described above in relation to the previous embodiments.

Figure 5A:
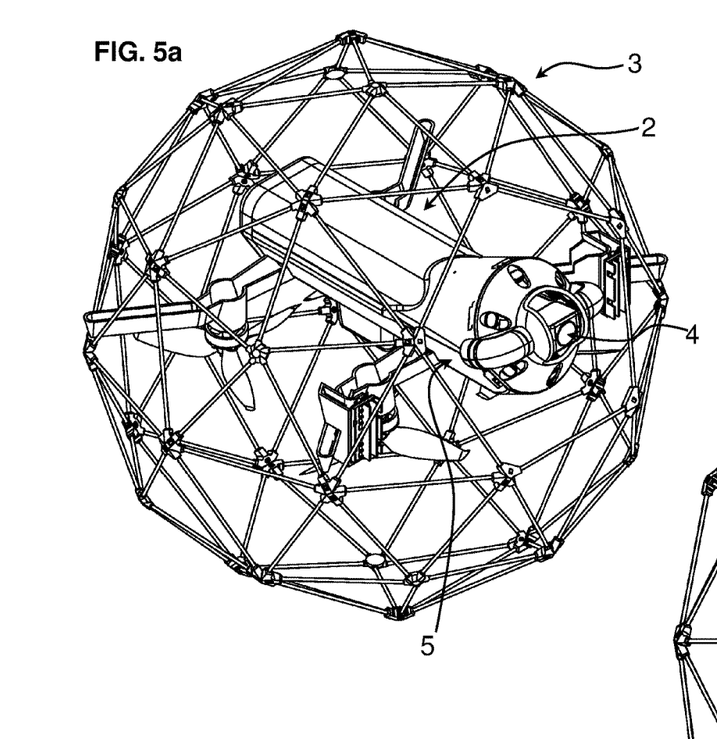
FIG. 5a is a perspective view of a UAV according to a fifth embodiment.
Figure 5B:
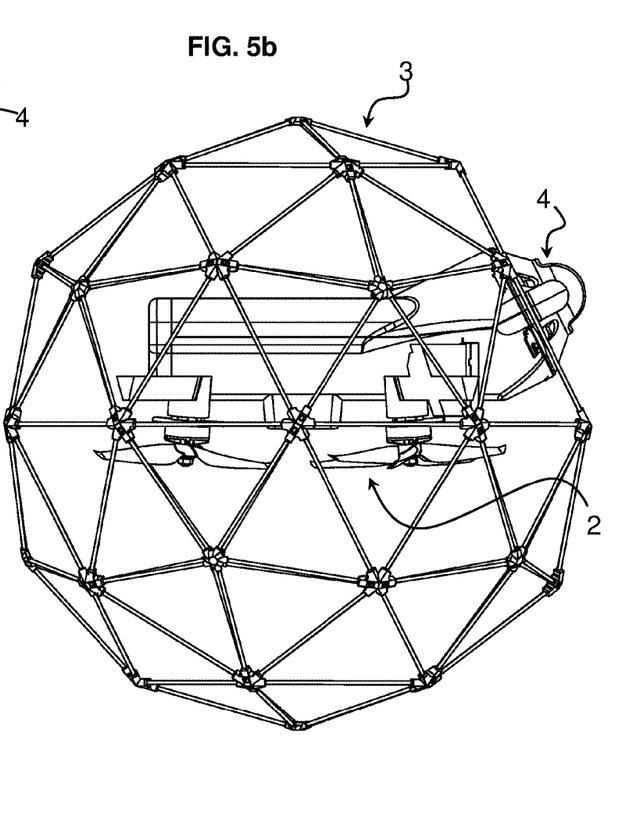

In the embodiment illustrated in FIGS. 5a and 5b, the sensor system 4 is mounted on the propulsion system 2, rather than directly to the outer protective cage 3. Elastic coupling between the sensor system 4 and the propulsion system is provided to push the propulsion system elastically into its operating position as illustrated in FIG. 5b where the front of the sensor system projects outside of the outer protective cage 3 and in particular beyond the plane of the cage frame member 8.

Figures 6A, 6B, 6C:
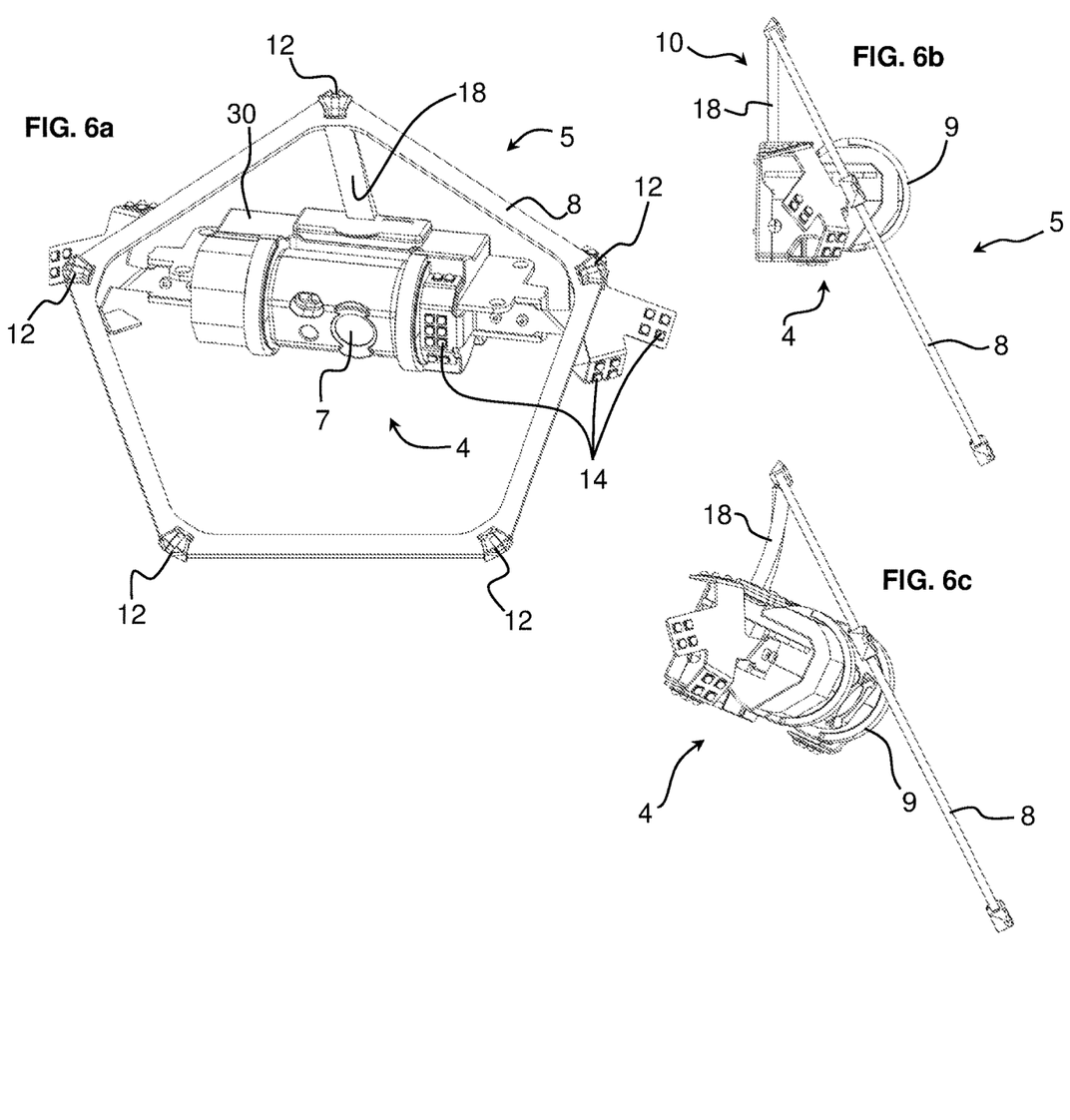

In the embodiment illustrated in FIG. 6a-6c, the sensor support system 5 comprises a spring coupling 18 in the form of an elastic arm. The elastic arm allows the sensor system to be elastically pushed into the outer protective cage 3 upon collision or contact with an external object by elastic bending or twisting of the arm. The elastic arm can flex and twist in space. Therefore, it can free-up multiple degrees of freedom. In addition, it has the advantage to simplify integration of the coupling in a UAV. In the illustrated embodiment, the elastic arm 18 is attached at one end to the housing 30 of the sensor system 4 and at it's other end to an apex or node of the cage frame member 8. The elastic arm may advantageously be made of an elastomeric material, such as a polymeric elastomer or rubber.

In the embodiment illustrated in FIG. 6a-6c, the sensor guard 9 is integrally formed with the sensor system housing 30. The sensor guard 9 may advantageously comprise exterior deformable cushioning material to reduce the amplitude of peak acceleration on the sensor system 4 during impact against an external object. Exemplary embodiments of the exterior cushioning comprise layers of viscoelastic foam, elastomeric pad, and microlattice structures. It may be noted that the deformable cushioning material may be provided on the sensor guards or housings of the sensor system in any of the previously described embodiments.

To reduce the severity of impacts on the sensor system in case of contact in the areas where the field of view cannot be obstructed, the invention decouples the sensor system from the rest of the UAV. The result is a two-body system, coupled through a load-limiting coupling mechanism. Besides force and acceleration, key performance indicators in crashworthiness are impact energy and impulse. The present invention is based on the strategy of decoupling the inertia of the UAV from the inertia of the sensor system. Consequently, the sensor system is not subject to the impact energy of the entire UAV 1, but rather to the impact energy of the sensor system 4 alone, which is significantly lower than that of the UAV, for instance typically around ten times lower. This means that during an impact the load generated by the momentum of the UAV passes through the outer protective cage 3 and not through the sensor system, which is connected in parallel to the cage and not in series with it. The equation of translational motion for a rigid body can be written as $\Sigma \vec{F} = m\vec{a}_G = m(d\vec{v}_G/dt)$. Assuming that the mass of the body is constant, multiplying both sides by dt and integrating from $t=t_1$, $\vec{v}_G=(\vec{v}_G)_1$ to $t=t_2$, $\vec{v}_G=(\vec{v}_G)_2$ yields to $$\Sigma \int_{t_1}^{t_2} \vec{F} dt = m(\vec{v}_G)_2 - m(\vec{v}_G)_1 \quad (1)$$

Figure 7:
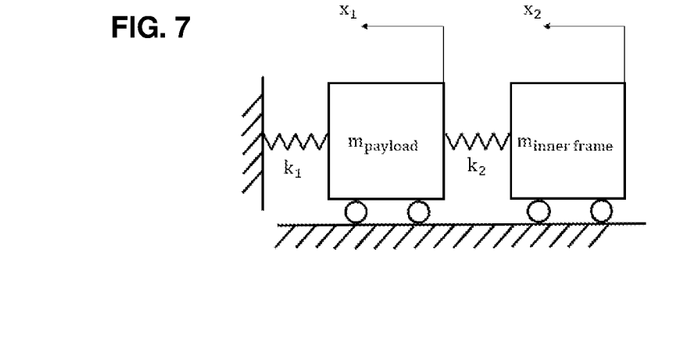
FIG. 7 is a schematic illustration of a system of two elastically coupled masses.

This equation is referred to as the principle of linear impulse and momentum. It states that the sum of all the impulses created by the external force system which acts on the body during the time interval $t_1$ to $t_2$ is equal to the change in the linear momentum of the body during the time interval. The impulse of the entire UAV 1 during an impact is much bigger than the impulse of the sensor system 4 itself. The difference is proportional to the mass ratio between the UAV and the sensor system, reduced by a factor which corresponds to the percent energy dissipation during the impact. Therefore, the decoupling reduces the portion of momentum taken by the sensor system. We can calculate the portion of momentum taken by the sensor system in the two cases—with and without the decoupling—by integrating the sensor system acceleration profile through the course of the impact. The sensor system acceleration profile in the two cases can be obtained through a simple dynamic model, such as illustrated in FIG. 7.

The decoupling leads to an important benefit in terms of damage generated by the impact, regardless of the amplitude of the acceleration peak. Indeed, the reduction in the impulse allows for a reduction in the material excitation and shear. If we use the analogy of a pendulum, the displacement that the pendulum undergoes after receiving a high acceleration for a short duration is much smaller than the displacement in the case where the pendulum is excited by a higher impulse where the peak acceleration is lower yet lasts longer. This is because what matters is the area under the peak, which is indeed the impulse. If the width of the impulse is such that the material itself does not have the time to respond to the excitation and deform, the components will not be sheared by the peak force.

The use of a decoupling system suits well the protection of the UAV sensor system 4, because it concerns principally or only low-velocity impacts. Low-velocity impacts are defined as events which can be treated as quasi-static, the upper limit of which can vary from one to tens of $ms^{-1}$ depending on the target stiffness, material properties and the impactor's mass and stiffness. High-velocity impact response instead is dominated by stress waves propagation through the material, in which the structure does not have time to respond, leading to very localized damages. In high-velocity impacts, boundary condition effects can be ignored because the impact event is over before the stress waves have reached the edge of the structure. In low-velocity impact, the dynamic structural response of the target is of utmost importance as the contact duration is long enough for the entire structure to respond to the impact and therefore more energy is absorbed elastically.

The load-limiting coupling mechanism according to the invention reversibly transitions between a rigid and a soft state, combining the advantages of both: stiffness under low loads ensures the stability of the sensor system while mechanical compliance prevents damages under high loads. The dual stiffness behavior is implemented, according to embodiments of the invention by using load limiters and spring elements. Load limiters may comprise devices based on various coupling mechanisms, including magnetic, electromagnetic, pneumatic, elastic snap-fit, or friction based. An exemplary embodiment of the load-limiting coupling mechanism features magnetic connections, which can be easily scaled to different loads and behave rigidly within a threshold. When the threshold is exceeded, the spring elements can undergo large deformations without failure due to overloading. Through the course of such deformation, the impact load generated by the momentum of the UAV is transferred to the cage frame member 8 which surrounds the sensor system 4 and interfaces the load-limiting coupling mechanism 10 with the outer protective cage 3 of the UAV 1.

Figure 8:
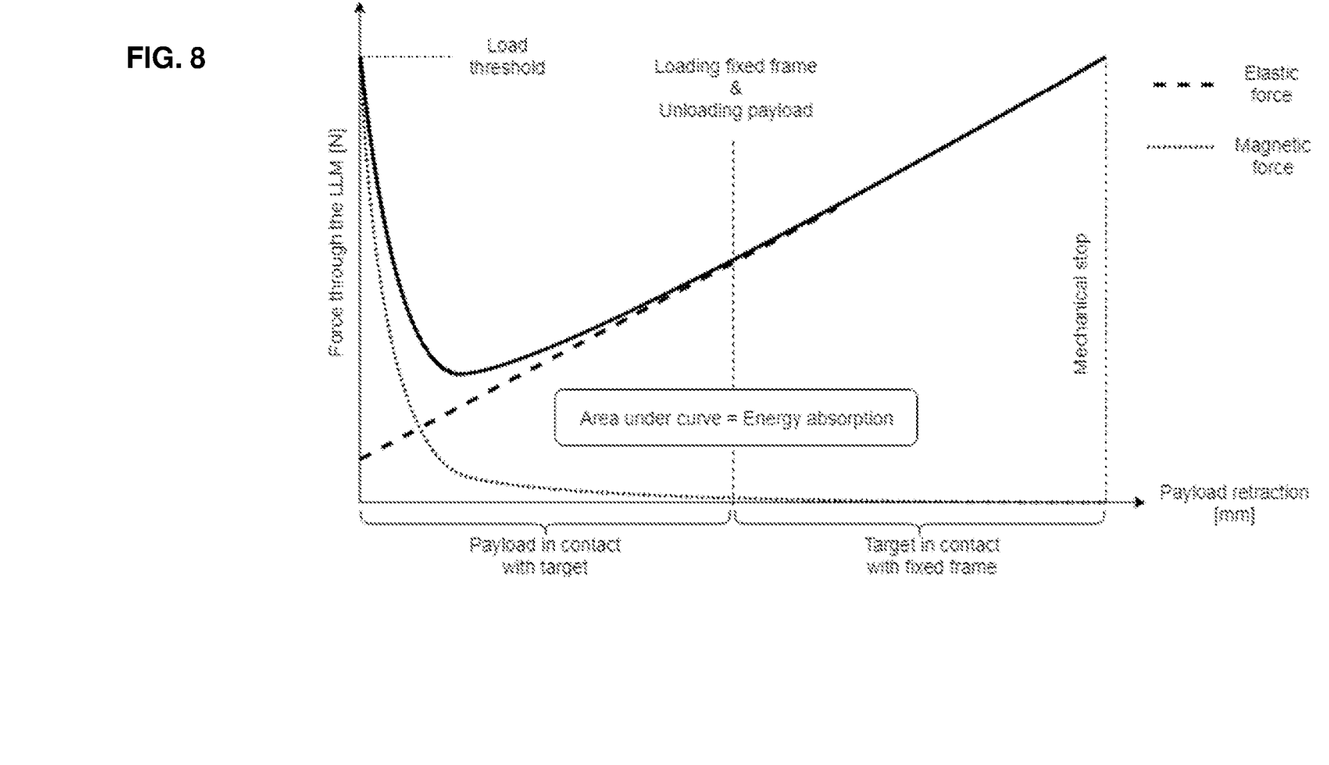
FIG. 8 is a graph illustrating a force versus displacement of a sensor system relative to an outer protective cage of a UAV according to embodiments of the invention.

The profile of load through the load-limiting coupling mechanism during impact against a target obstacle is schematized in FIG. 8. We observe that the force profile is given by the superposition of the elastic force of the prestressed spring with the magnetic field which decreases with the square of the distance. The area under the curve represents the energy absorbed by the load-limiting coupling mechanism through the course of the impact and the rebound. During the first phase of the impact, the target is in direct contact with the sensor system 4. Before overloading, the magnets 26 disengage, and the sensor system 4 begins to retract into the outer protective cage 3, until the point when the target comes in contact with the outer protective cage or a frame member fixed rigidly to the outer cage. Experimental evidence shows that in the same moment the contact between the target and the sensor system 4 ends. At that point, the load is transferred from the sensor system to the outer protective cage 3, which will be subject to the momentum of the whole UAV 1. While the outer protective cage is being loaded, the sensor system continues to retract into the outer protective cage and the spring coupling 18 will absorb the kinetic energy of its rebound. In case of impact energy above the specifications or in case of protruding target, a mechanical stop at the end of the stroke will absorb the energy in excess.

The design parameters of the spring coupling 18 (e.g. traction springs, elastic bands) can be selected by equating the rebound kinetic energy of the sensor system to the maximal elastic energy that the springs can store. The equivalence is shown in the following equation, where design integration requirements appear as an input in the form of $x_{max}$:

$$\frac{1}{2} \cdot m_{payload} \cdot v_{max}^2 = n_{springs} \cdot \left(\frac{1}{2} \cdot k \cdot x_{max}^2\right) \cdot \frac{\alpha}{\beta} \qquad (2)$$

where:
$m_{payload}$ is the mass of the body (i.e. the sensor system 4) suspended from the springs, for example in the range of 60 to 150 g
$v_{max}$ is the velocity after impact assuming perfectly elastic rebounding, for example in the range of 3 to 5 ms$^{-1}$
$n_{springs}$ is the total number of springs, which for example is two or more depending on the design
k is the spring elastic constant, output of the equation and for example in the order of 1 Nmm$^{-1}$
$x_{max}$ is the spring maximum elongation allowed by integration constraints, for example around 20 mm $$\frac{\alpha}{\beta}$$

is the ratio between the percent energy dissipation during impact and a safety factor.

The mode of deformation of the retractable sensor system 4 can be translational, rotational or a combination of both. The mode of deformation can be engineered to avoid secondary impacts with the UAV inner propulsion system 2. In addition, the rotational mode of deformation allows to absorb impact energy by converting the translational kinetic energy of the sensor system into rotational kinetic energy. In case of rotation, the retractable sensor system 4 is defined as pivoting sensor system. The strategy of the pivoting sensor system requires to introduce a hinge which suppresses two of the three degrees of freedom of the retractable body in the side plan of the UAV. As a rigid hinge would be prone to failure in case of overloading, a deformable hinge is preferred. A deformable hinge can be defined as localized reduction of stiffness and can be implemented by means of traction springs or torsional springs. The deformable hinge is designed to behave as a rigid hinge in collisions within its operating range (for example in collisions up to 5 ms$^{-1}$) and to extend elastically in collisions at higher speeds.

When the sensor system is subject to rotation, the equivalent torsional stiffness of the springs can be calculated by applying the work conservation and the hypothesis of small displacements. Therefore, the equivalent torsional stiffness of the springs should be $K_{eq\theta}=k \cdot d_k^2$ where k is the stiffness of the extension springs and $d_k$ is the distance between the pivot axis and the extension springs.

LIST OF REFERENCES IN THE DRAWINGS

UAV 1
Propulsion system 2
Outer protective cage 3
Frame modules 6
Beams 11
Connectors 12
Sensor system 4
Image capture device 7
Lighting system 14
Sample probe
Support structure/housing 30
Sensor support system 5
Cage frame member 8
Frame element 8'
Coupling mechanism 10
Support member 16
Spring coupling 18
Traction spring 20
Coil spring
Beam plate spring 22
Frame Connection portion 34
Load limited releasable rigid coupling 26, 26a, 26b
magnetic centring device
Hinge 24
Position stop 32
Sensor guard 9
Damper

The invention claimed is:

1. Unmanned aerial vehicle (UAV) capable of hovering flight, the UAV comprising:
an elastically deformable outer protective cage,
a propulsion system mounted inside the outer protective cage,
a sensor support system indirectly coupled to the propulsion system via a portion of the outer protective cage, wherein the sensor support system comprises a cage frame member coupled to the outer protective cage, and
a sensor system coupled to the sensor support system and configured to project through the cage frame member, wherein
the sensor system is coupled to the sensor support system via a passive coupling mechanism without motorized actuation that comprises a spring coupling exerting an elastic bias against the sensor system towards an operating position,
the sensor system being retractable into the outer protective cage against the elastic bias of the spring coupling upon collision with an external object, and
wherein the coupling mechanism further comprises a load limited releasable rigid coupling providing a stable rigid positioning of the sensor system in said operating position, the rigid coupling being releasable upon exercise of a collision force greater than a predetermined threshold.

2. UAV according to claim 1, wherein the load limited releasable rigid coupling comprises a magnetic coupling.

3. UAV according to claim 1, wherein the sensor system is pivotally mounted to the sensor support system.

4. UAV according to claim 1, wherein the cage frame member is shaped to replace a frame module shape of the protective outer cage.

5. UAV according to claim 1, wherein the cage frame member is shaped in the shape of a pentagon.

6. UAV according to claim 1, wherein the outer protective cage comprises beams connected together to form triangular frame shapes, the triangular frame shapes arranged in frame modules having an outer pentagon shape.

7. UAV according to claim 1, wherein the spring coupling comprises a beam plate spring rigidly attached to, or integrally formed with, the cage frame member, the beam plate spring being generally rigid in a direction essentially parallel to a plane of the cage frame member and flexible in an orthogonal direction thereto.

8. UAV according to claim 7, wherein the beam plate spring is formed of a composite material in an essentially planar sheet form, for instance of a carbon fiber, glass fiber or other fiber material embedded in a resin, such as an epoxy resin.

9. UAV according to claim 1, wherein the spring coupling comprises a traction spring.

10. UAV according to claim 1, wherein the spring coupling comprises an elastic arm attached at one end to the cage frame member and at the other end to the sensor system, the elastic arm capable of elastically bending and twisting.

11. UAV according claim 10 wherein the elastic arm is made of an elastomeric material.

12. UAV according to claim 1, wherein the sensor system comprises an image capture device for capturing moving or still images.

13. UAV according to claim 1, wherein the sensor system further comprises a lighting system.

14. UAV according to claim 1, wherein the sensor system comprises a sensor guard that extends beyond a front face of the sensor system.

15. UAV according to claim 1, wherein the sensor system is coupled to the sensor support system using a plurality of springs.

16. UAV according to claim 1, wherein the cage frame member is spring mounted to the outer protective cage using a plurality of springs.

* * * * *